United States Patent [19]

Kuma et al.

[11] Patent Number: 4,871,607
[45] Date of Patent: Oct. 3, 1989

[54] HUMIDITY EXCHANGER ELEMENT

[75] Inventors: Tosimi Kuma, 25-8, 3-chome, Maimatsubara, Higashi-ku, Fukuoka-shi, Fukuoka-ken, Japan; Hiroshi Okano, Fukuoka, Japan

[73] Assignees: Kabushiki Kaisha Seibu Giken; Tosimi Kuma, both of Fukukoka, Japan; part interest to each

[21] Appl. No.: 217,034

[22] Filed: Jul. 11, 1988

Related U.S. Application Data

[63] Continuation of Ser. No. 21,212, Mar. 3, 1987, abandoned.

[30] Foreign Application Priority Data

Mar. 10, 1986 [JP] Japan .................................. 61-35177

[51] Int. Cl.$^4$ ............................................ B01D 53/06
[52] U.S. Cl. .................................... 428/186; 428/184; 55/388; 55/390
[58] Field of Search ...................... 428/184, 186, 178; 55/388, 390

[56] References Cited

U.S. PATENT DOCUMENTS

| | | | |
|---|---|---|---|
| 3,782,081 | 1/1974 | Munters | 428/184 |
| 4,289,513 | 9/1981 | Brownhill et al. | 428/186 X |
| 4,402,717 | 9/1983 | Izumo et al. | 55/388 |

OTHER PUBLICATIONS

Hackh's Chem. Dictionary, 4th Ed., p. 610, definition of "Silica Gel".

Primary Examiner—Alexander S. Thomas
Attorney, Agent, or Firm—Staas & Halsey

[57] ABSTRACT

The invention relates to a humidity exchanger element comprising of a matrix formed by laminating single-faced corrugated sheets and an active silica-alumina aerogel just synthesized and adhered on said sheets and on the gap between the fibers of said sheets; the main constituents of said sheet being an inorganic fiber selected from the group consisting of ceramic fiber, glass fiber, slag fiber, carbon fiber and mixtures of them, the thickness of said sheet being in the range of 0.18–0.25 mm, the wave length of said corrugated sheet being in the range of 2.5–4.2 mm, and the wave height of said corrugated sheet being in the range of 1.5–2.3 mm; and the composition of said aerogel being 97–85% of silicon dioxide and 3–15% of aluminum oxide.

12 Claims, 4 Drawing Sheets

HUMIDITY EXCHANGER ELEMENT

This is a continuation of co-pending application Ser. No. 021,212, filed On Mar. 3, 1987 abandoned.

BACKGROUND OF THE INVENTION

1. Field of the Invention

The present invention relates to a humidity exchanger element for obtaining dehumidified gas such as dry air continuously by passing feed gas and desorbing gas alternately through the element consisting of a block with many small channels and being formed of solid adsorbent capable of adsorbing the humidity reversibly.

2. Description of the Prior Art

In our Japanese Patent Application No. 86969/1985 (U.S. patent application Ser. No. 852,291), a method of manufacturing a humidity exchanger element or a total heat energy exchanger element has been proposed, in which sheets of low density paper of inorganic fiber such as ceramic fiber are laminated in the shape of a humidity exchanger element or a total heat energy exchanger element with many small channels, impregnated with water glass solution before or after the forming process, soaked in water solution of aluminum salts, magnesium salts or calcium salts after forming so that water glass and the salt react to produce hydrogel of silicate, and washed and dried to get a humidity exchanger element or a total heat energy exchanger element consisting mainly of silicate aerogel with the matrix of inorganic fiber paper.

SUMMARY OF THE INVENTION

It is an object of the present invention to provide a humidity exchanger element which has high efficiency and little pressure loss by forming solid adsorbent capable of adsorbing the humidity reversibly in the shape of a block with many small channels.

In the present invention, a paper of 0.18–0.25 mm thickness, the main constituent of which is an inorganic fiber selected from the group consisting of ceramic fiber, glass fiber, slag fiber, carbon fiber and mixtures of them, is prepared. It is formed in a single-faced corrugated paper of wave length 2.5–4.2 mm and of wave height 1.5–2.3 mm, and said single-faced corrugated papers are laminated to form a block with many small channels, namely the matrix of the humidity exchanger element. Adsorbent consisting of just synthesized active silica-alumina aerogel, containing 97–85% of silicon dioxide and 3–15% of aluminum oxide, is bonded to and is combined with the surface of the paper and fiber gaps of said matrix, forming the main constituent of the humidity exchanger element. The length of channels can be changed according to the flowing speed of the feed gas in channels, to the necessary time to reach the adsorption equilibrium point of the element and to the adsorption ability of active silica-alumina aerogel. In the case of wind velocity being 1–4 m/sec. in front of the element, the length of channels is about 100–400 mm.

BRIEF DESCRIPTION OF THE DRAWINGS

The drawings show examples of the present invention.

DETAILED DESCRIPTION OF THE PREFERRED EMBODIMENTS

Figure 1:
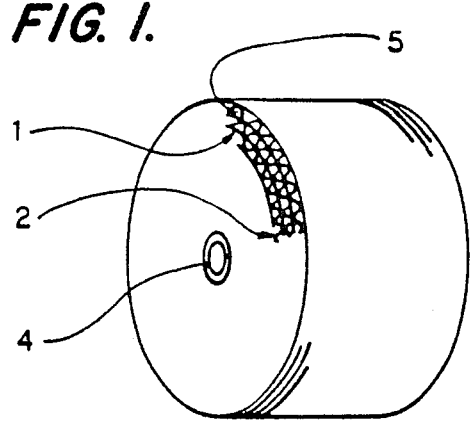
FIG. 1 is a perspective view of a rotary type humidity exchanger element.
Figure 5:
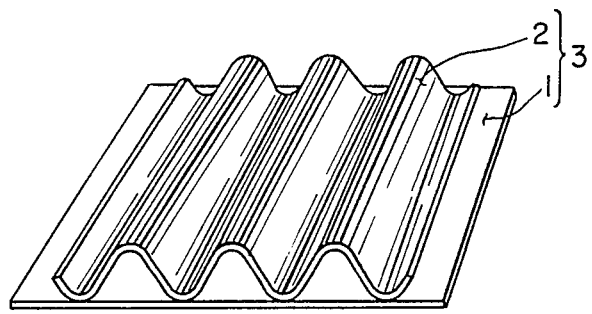
FIG. 5 is a perspective view of a single-faced corrugated paper.

A flat sheet 1 and a corrugated sheet 2 with wave length of 2.5–4.2 mm and wave height of 1.5–2.3 mm, both of which are very porous papers made of 70–90% of heat resistant inorganic fiber with fiber diameter of 3–15 microns, selected from the group consisting of ceramic fiber, glass fiber, slag fiber, carbon fiber and mixtures of them, 5–20% of pulp (wood pulps, other vegetable pulps or synthetic pulps) and 5–10% of binder and having a thickness of 0.18–0.25 mm and a density of not more than 0.5 g/cm$^3$, are bonded together with the adhesive of water glass solution so that the ridges of the corrugated paper 2 adhere to the flat liner paper 1 to obtain a single-faced corrugated paper 3 of 100–400 mm width as shown in FIG. 5. As shown in FIG. 1, the single-faced corrugated paper 3 is wound around a shaft 4 to form the cylindrical shape, burned to delete the organic materials, impregnated with water solution of water glass, dried, soaked in water solution of aluminium sulphate, washed with water and dried to obtain a cylinder shaped rotary type humidity exchanger element mainly consisting of active silica-alumina (aluminium silicate) aerogel reinforced with the matrix of heat resistant fiber paper. One example of the chemical composition of the element is $SiO_2$ 82%, $Al_2O_3$ 16%, $Fe_2O_3$ 0.05%, CaO 1.5%, MgO 0.01%, $Na_2O$ 0.1% and $K_2O$ 0.01%. In the drawing 5 shows a small channel.

Figure 2:
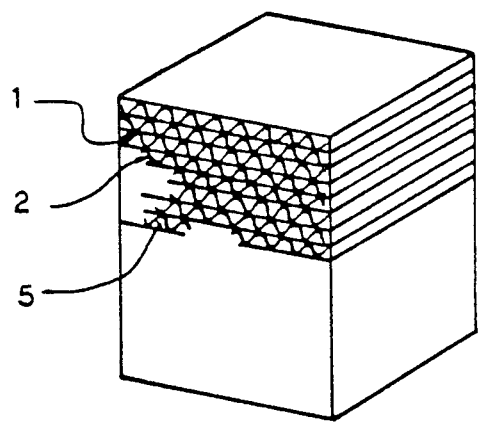
FIG. 2 is a perspective view of a parallel flow type humidity exchanger element.

FIG. 2 shows a parallel flow type humidity exchanger element formed by laminating rectangular single-faced corrugated papers.

Figure 3:
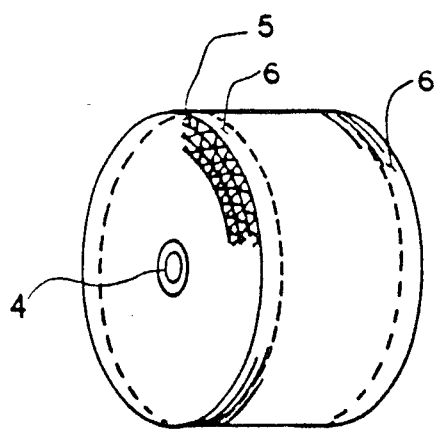
FIG. 3 is a perspective view of a rotary type humidity exchanger element whose edges are impregnated with reinforcing agent.

FIG. 3 shows an example of the humidity exchanger element reinforced by impregnating both edges 6, 6 of the element shown in FIG. 1, where small channels 5 are visible, with reinforcing agent such as liquid synthetic resin (for example epoxy resin), silica sol or alumina sol to the depth of about 1–5 mm.

Figure 4:
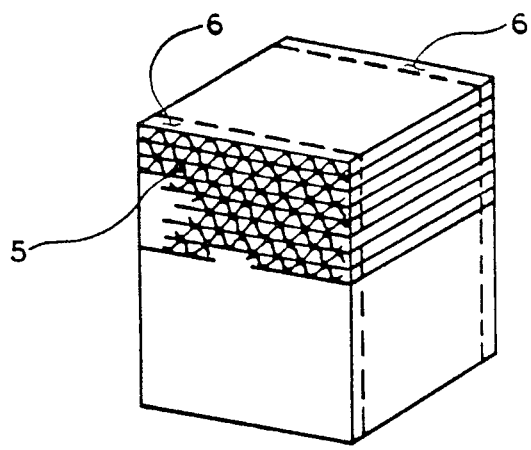
FIG. 4 is a perspective view of a parallel flow type humidity exchanger element whose edges are impregnated with reinforcing agent.

FIG. 4 shows an example of the humidity exchanger element reinforced by impregnating both edges 6, 6 of the element shown in FIG. 2, where small channels 5 are visible, with reinforcing agent such as liquid synthetic resin, silica sol or alumina sol to the depth of about 1–5 mm.

EFFECT OF THE PRESENT INVENTION

As described above, the humidity exchanger element of the present invention consists of a matrix in the shape of the exchanger element and an adsorbent bound to said matrix and being the main constituent, said matrix consisting of a paper of heat resistant fiber selected from the group consisting of ceramic fiber, glass fiber, slag fiber, carbon fiber and mixtures of them, said paper being a very porous paper of bulk density of not more than 0.5 g/cm$^3$ (in the case of paper of 0.2 mm thickness, not more than 100 g/m$^2$) formed in a honeycomb structure, and said adsorbent being active silica-alumina aerogel consisting of SiO$_2$ 97-85% and Al$_2$O$_3$ 3-15% being synthesized, and at the same time bound to and combined with said matrix. The prior element using organic fibers for materials, which expands and contracts greatly by heat or humidity, has no heat resistance and deteriorates immediately by the desorbing air of higher temperature than 100° C. and does not withstand long-term use. The element of the present invention has an excellent heat resistance and there is no possibility of deterioration by exposing in the temperature of not less than 100° C. for a long time. It has a small coefficient of heat expansion and there is no possibility of causing environmental pollution by scattering fibers together with the gas that passes through the small channels as in the case of asbestos fiber. The element of the present invention differs from the prior element which is impregnated with a deliquescent absorbent solution such as water solution of lithium chloride, and which cannot be used for the highly humid feed air of the relative humidity of more than 75% because of the possibility of the absorbent absorbing water, becoming water solution of the absorbent and causing carrying-over.

The element of the present invention has excellent characteristics such that sufficient volume of adsorbent can be strongly held for a long period of time in fiber gaps or on fiber sheets to maintain its shape, and water molecules can be strongly adsorbed on the innumerable small channels of about 15 Å diameter, and by heating water molecules can be easily released.

As the element is formed by laminating single-faced corrugated sheets whose paper thickness is in the range of 0.18–0.25 mm, whose wave length 2.5–4.2 mm and whose wave height 1.5–2.3 mm, the developed surface area of the formed element amounts to 2000–4000 m$^2$/m$^3$. When humid gas such as air is sent into many small channels of the humidity exchanger element of the present invention, the gas sufficiently contacts the adsorbent forming the walls of small channels and bound in the fiber gaps of heat resistant fiber paper and the humidity in the gas is adsorbed on the large effective surface of said adsorbent. When the flowing speed is in the range of 0.5–5 m/sec. in front of the element, pressure loss is small and dehumidified air or other gases can be obtained surely with very little operating expenses.

Figure 6:
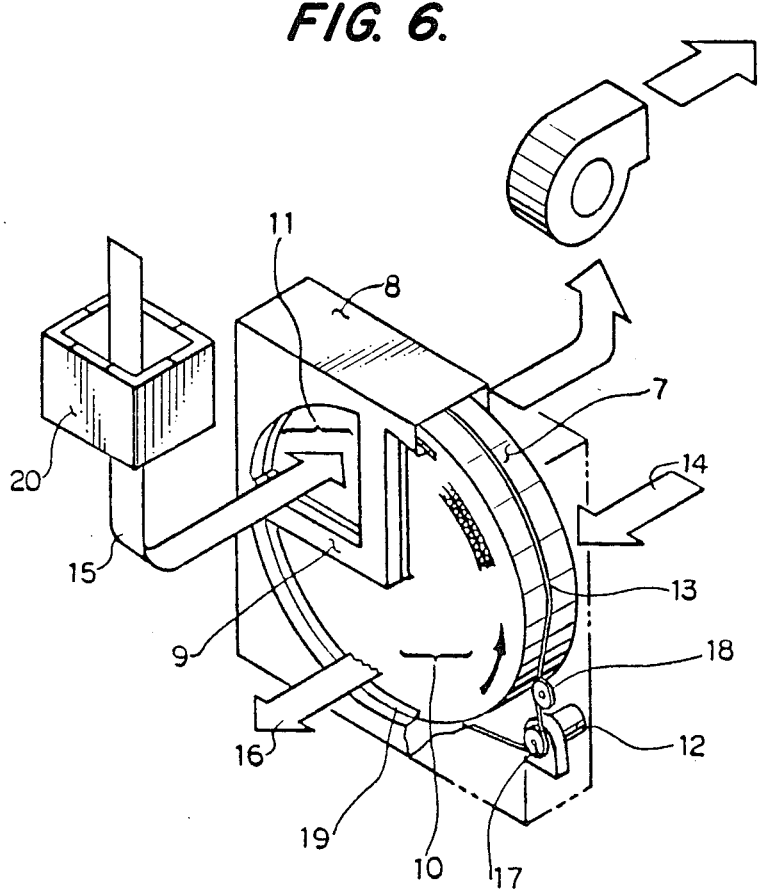
FIG. 6 is a perspective view of a dehumidifier with a rotary type humidity exchanger element, a portion of the structure being broken away for the purpose of illustration.

FIG. 6 shows a dehumidifier composed using a cylindrical humidity exchanger element 7 shown in FIG. 1. The humidity exchanger element 7 is held rotatably in a casing 8 which is separated by a separator 9 into a processing (dehumidifying) zone 10 and a regenerating zone 11. The element 7 is rotated by a geared motor 12 and a driving belt 13 and the highly humid feed air 14 is sent into the processing zone 10 and the hot and less humid desorbing air 15 into the regenerating zone 11, dehumidifying the feed air 14 to obtain a dry air 16. In the drawing, 17 is a pulley, 18 is a tension pulley, 19 is a rubber seal and 20 is a heater for the desorbing air.

Figure 7:
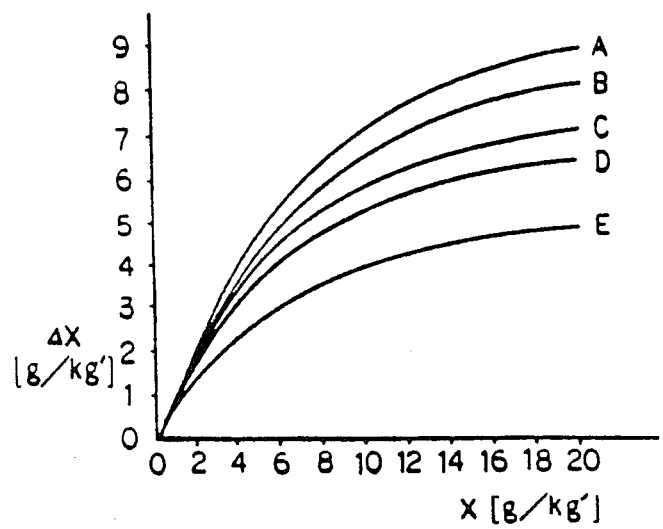
FIG. 7 is a graph showing the dehumidifying performances of the various humidity exchanger elements.

FIG. 7 shows the dehumidifying ability of a dehumidifier constructed as shown in FIG. 6 using the elements obtained, as stated above, with heat resistant fiber paper of 0.22 mm of thickness, the diameter of the element being 320 mm and the thickness, i. e., the length of small channels being 200 mm, and the wave length and the wave height of the corrugated sheet 2 and the ingredients of the active silica-alumina adsorbent being as shown in the following table:

|   | wave length [mm] | wave height [mm] | SiO$_2$ [%] | Al$_2$O$_3$ [%] |
|---|---|---|---|---|
| A | 2.0 | 1.3 | 97 | 3 |
| B | 2.5 | 1.5 | 97 | 3 |
| C | 3.5 | 1.9 | 90 | 10 |
| D | 4.2 | 2.3 | 85 | 15 |
| E | 4.5 | 2.5 | 85 | 15 | under the conditions of the flowing speed of the feed air 14 and the desorbing air 15 in front of the element being 2.0 m/sec., the ratio of the volumes of the desorbing air and the feed air sent into the dehumidifier in a certain period of time being 1:3, the rotating speed of the element being 18 r.p.h., the temperature of the feed air at the entrance of the element being 25° C., the absolute humidity of the feed air being 4–19 g/kg', the temperature of the desorbing air at the entrance of the element being 140° C., and the absolute humidity of the desorbing air at the entrance of the element being the same as the absolute humidity of the feed air at the entrance of the element. In the drawing, the abscissa shows the absolute humidity [g/kg'] of the feed air at the entrance and the ordinate shows the quantity of adsorbed humidity Δx [g/kg], i.e., the dehumidifying ability of the element, and it is understood that a satisfactory dehumidifying ability as a dehumidifier can be obtained when the wave length is not more than 4.2 mm and the wave height not more than 2.3 mm.

Figure 8:
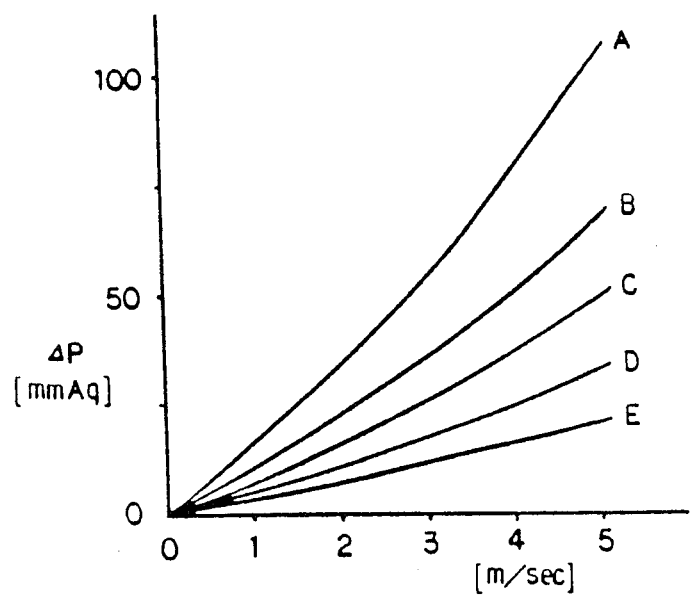
FIG. 8 is a graph showing the pressure losses of the various humidity exchanger elements.

FIG. 8 shows the pressure loss ΔP [mmAq] when the flowing speeds of the feed air and of the desorbing air in front of the element are 0.5–3 m/sec. and the other conditions are same as above. In the drawing, the abscissa shows the flowing speeds [m/sec.] of the feed air and of the desorbing air at the entrance of the element and the ordinate shows the pressure losses ΔP [mmAq]. It can be seen that the pressure loss increases and the power cost for operating the dehumidifier increases greatly when the wave length is less than 2.5 mm, for example 2.0 mm, and the wave height less than 1.5 mm, for example 1.3 mm. Therefore, when the composition of the active silica-alumina aerogel adsorbent is SiO$_2$ 97-85% and Al$_2$O$_3$ 3-15%, the wave length of the single-faced corrugated sheet 2.5–4.2 mm, and the wave height 1.5–2.3 mm; the dehumidifier shows a good dehumidifying ability and it can be run economically. Especially it is the best when the wave length is 3.5 mm and the wave height 1.9 mm.

As shown in FIG. 3 and FIG. 4, the impregnation of the edge surfaces of the humidity exchanger element, where small channels are visible, with a reinforcing agent such as a liquid synthetic resin, silica sol and alumina sol and the drying or the hardening are effective in reinforcing the edge surfaces and making the element usable for a long time.

Figure 9:
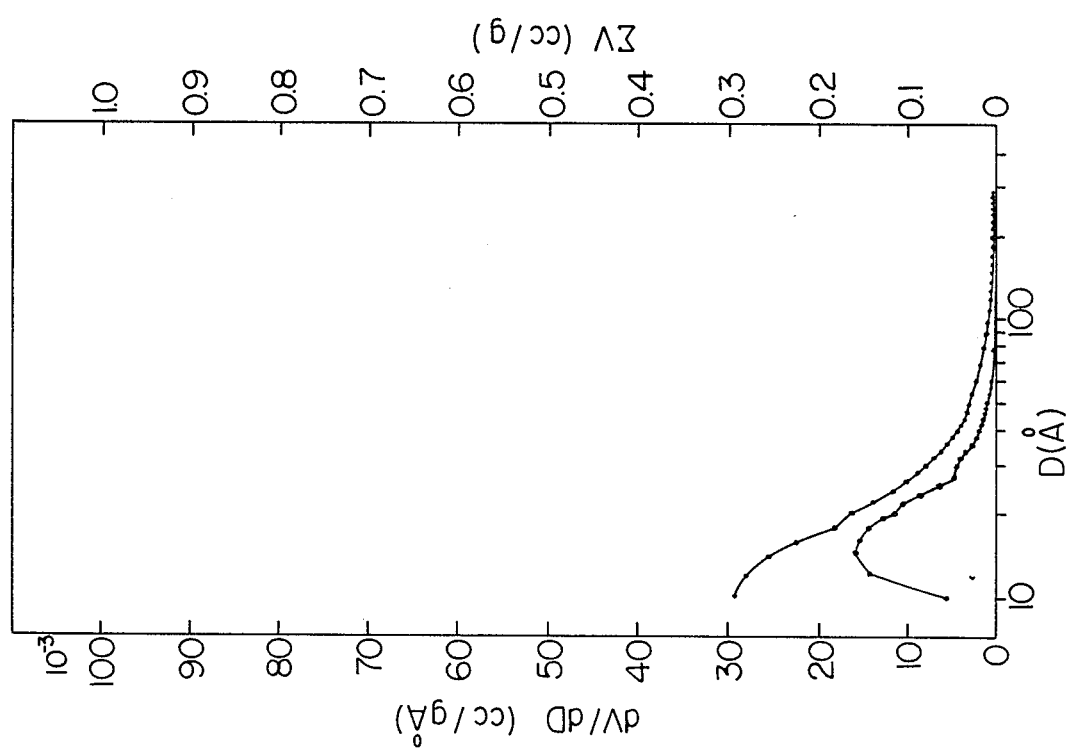
FIG. 9 is a graph showing the pore size distribution and accumulation of pore volume in a sheet of ceramic fiber.

FIG. 9 shows the pore size distribution dV/dD (cc/g.Å) (the lower curve) and the accumulation of pore volume ΔV (cc/g) (the upper curve) in a sheet of a ceramic fiber (silica-alumina, fiber diameter: 3-15 microns) with an active silica-alumina aerogel (silica 90% and alumina 10%, surface area by BET method: 453 m²/g) adhered on the ceramic fiber sheet (abscissas shows pore diameter).

Figure 10:
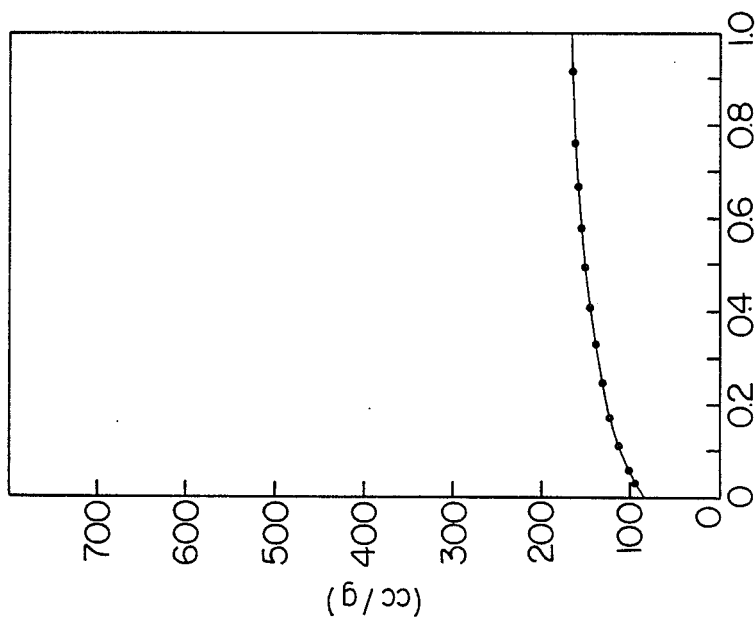
FIG. 10 is a graph showing the relationship of the partial pressure of nitrogen gas and the volume of nitrogen gas adsorbed on the sheet.

FIG. 10 shows the adsorption isotherm, i.e. the relation of the partial pressure of nitrogen gas (atm.) (abscissas) and the volume of nitrogen gas absorbed on the sheet with aerogel as mentioned above (cc/g) at the room temperature (ordinate).

What is claimed:

1. A humidity exchanger element comprising:
    a matrix consisting of a block formed by laminating single-faced corrugated sheets, the main constituent of said sheets being an inorganic fiber selected from the group consisting of ceramic fiber, glass fiber, slag fiber, carbon fiber and mixtures thereof, the thickness of said sheets being in the range of 0.18-0.25 mm, the wave length of said corrugated sheets being in the range of 2.5-4.2 mm, and the wave height of said corrugated sheets being in the range of 1.5-2.3 mm; and
    a layer of just-synthesized active silica-alumina aerogel bonded to and combined with surfaces of said sheets and fiber gaps of said matrix, the composition of said aerogel being 97-85% of silicon dioxide and 3-15% of aluminum oxide.

2. A humidity exchanger element according to claim 1, wherein edges of said element are reinforced with an impregnated reinforcing agent.

3. A humidity exchanger element according to claim 1, wherein said corrugated sheets comprise corrugated papers bonded to flat papers with an adhesive water glass solution.

4. A humidity exchanger element comprising:
    a block having a plurality of corrugated sheets forming a matrix structure; and
    a layer of active just-synthesized silica-alumina aerogel bonded to surfaces of said sheets and fiber gaps of said matrix, said aerogel being composed of 85%-97% silicon dioxide and 15%-3% aluminum oxide.

5. A humidity exchanger element according to claim 4, wherein said sheets have a thickness from 0.18 millimeters to 0.25 millimeters, a wavelength of 2.5 millimeters to 4.2 millimeters and a wave height of from 1.5 millimeters to 2.3 millimeters.

6. A humidity exchanger element according to claim 4, wherein said sheets are composed of an inorganic fiber selected from the group consisting of ceramic fiber, glass fiber, slag fiber, carbon fiber and mixtures of said fibers.

7. A humidity exchanger element according to claim 4, wherein edges of said element are reinforced with an impregnated reinforcing agent.

8. A humidity exchanger element according to claim 4, wherein said corrugated sheets comprise corrugated papers bonded to flat papers with an adhesive water glass solution.

9. A humidity exchanger element consisting essentially of:
    a block having a plurality of corrugated sheets forming a matrix structure; and
    an adsorbent consisting of just-synthesized active silica-alumina aerogel bonded to and combined with surfaces of the sheets and fiber gaps of said matrix.

10. A humidity exchanger element according to claim 9, wherein said aerogel is composed of 85%-97% silicon dioxide and 15%-3% aluminum oxide.

11. A humidity exchanger element according to claim 9, wherein said sheets are composed of an inorganic fiber selected from the group consisting of ceramic fiber, glass fiber, slag fiber, carbon fiber and mixtures of said fibers.

12. A humidity exchanger element according to claim 9, wherein said corrugated sheets comprise corrugated papers bonded to flat papers with an adhesive water glass solution.

* * * * *

UNITED STATES PATENT AND TRADEMARK OFFICE
CERTIFICATE OF CORRECTION

PATENT NO. : 4,871,607

DATED : October 3, 1989

INVENTOR(S) : TOSHIMI KUMA et al.

It is certified that error appears in the above-identified patent and that said Letters Patent is hereby corrected as shown below:

Column 5, line 13, "absorbed" should be --adsorbed--.

Signed and Sealed this

Twenty-eighth Day of August, 1990

Attest:

HARRY F. MANBECK, JR.

*Attesting Officer*   *Commissioner of Patents and Trademarks*